United States Patent
Biso et al.

(10) Patent No.: US 11,081,760 B2
(45) Date of Patent: Aug. 3, 2021

(54) COATED BATTERY SEPARATOR

(71) Applicant: SOLVAY SPECIALTY POLYMERS ITALY S.P.A., Bollate (IT)

(72) Inventors: Maurizio Biso, Milan (IT); Elena Molena, Milan (IT); Roberta Colombo, Varedo (IT)

(73) Assignee: SOLVAY SPECIALTY POLYMERS ITALY S.P.A., Bollate (IT)

( * ) Notice: Subject to any disclaimer, the term of this patent is extended or adjusted under 35 U.S.C. 154(b) by 211 days.

(21) Appl. No.: 15/769,408

(22) PCT Filed: Oct. 19, 2016

(86) PCT No.: PCT/EP2016/075013
§ 371 (c)(1),
(2) Date: Apr. 19, 2018

(87) PCT Pub. No.: WO2017/067948
PCT Pub. Date: Apr. 27, 2017

(65) Prior Publication Data
US 2018/0315972 A1   Nov. 1, 2018

(30) Foreign Application Priority Data

Oct. 19, 2015   (EP) .................................... 15190363

(51) Int. Cl.
| | |
|---|---|
| *H01M 2/16* | (2006.01) |
| *H01M 50/449* | (2021.01) |
| *H01M 10/0525* | (2010.01) |
| *H01M 50/403* | (2021.01) |
| *H01M 50/411* | (2021.01) |
| *H01M 50/446* | (2021.01) |
| *C09D 5/02* | (2006.01) |
| *C09D 127/16* | (2006.01) |
| *H01G 11/52* | (2013.01) |
| *H01G 11/84* | (2013.01) |

(52) U.S. Cl.
CPC .......... *H01M 50/449* (2021.01); *C09D 5/022* (2013.01); *C09D 127/16* (2013.01); *H01G 11/52* (2013.01); *H01G 11/84* (2013.01); *H01M 10/0525* (2013.01); *H01M 50/403* (2021.01); *H01M 50/411* (2021.01); *H01M 50/446* (2021.01); *Y02E 60/10* (2013.01)

(58) Field of Classification Search
CPC .. H01M 2/145; H01M 2/166; H01M 10/0525; H01M 2/1653; H01M 2/1686; H01M 50/449; H01M 50/446; H01M 50/403; H01M 50/411; C09D 5/022; C09D 127/16; H01G 11/52; H01G 11/84; Y02E 60/10
USPC ......................................................... 429/144
See application file for complete search history.

(56) References Cited

U.S. PATENT DOCUMENTS

| | | | |
|---|---|---|---|
| 2002/0168569 A1 | 11/2002 | Barriere et al. | |
| 2013/0309549 A1* | 11/2013 | Luski | H01M 2/1653 429/145 |
| 2014/0038025 A1* | 2/2014 | Ha | H01M 2/1686 429/144 |
| 2015/0056491 A1* | 2/2015 | Zhao | H01M 2/1653 429/144 |

FOREIGN PATENT DOCUMENTS

WO   2013120858 A1   8/2013

OTHER PUBLICATIONS

Saunier J. et al., "Plasticized microporous poly(vinylidene fluoride) separators for Lithium-ion batteries. I. Swelling behavior of dense membranes with respect to a liquid electrolyte—Characterization of the swelling equilibrium", Journal of Polymer Science—Part B—Polymer Physics., 2004, vol. 42, pp. 532-543—Wiley Periodicals Inc.
Standard ISO 13321—Particle size analysis—Photon correlation spectroscopy—Jul. 1, 1996—p. 1-20.

* cited by examiner

*Primary Examiner* — Jonathan G Jelsma
*Assistant Examiner* — Omar M Kekia
(74) *Attorney, Agent, or Firm* — Osha Bergman Watanabe & Burton LLP

(57) ABSTRACT

The present invention pertains to an at least partially coated separator for an electrochemical cell, to a method for its preparation and to an electrochemical cell comprising such separator.

19 Claims, 1 Drawing Sheet

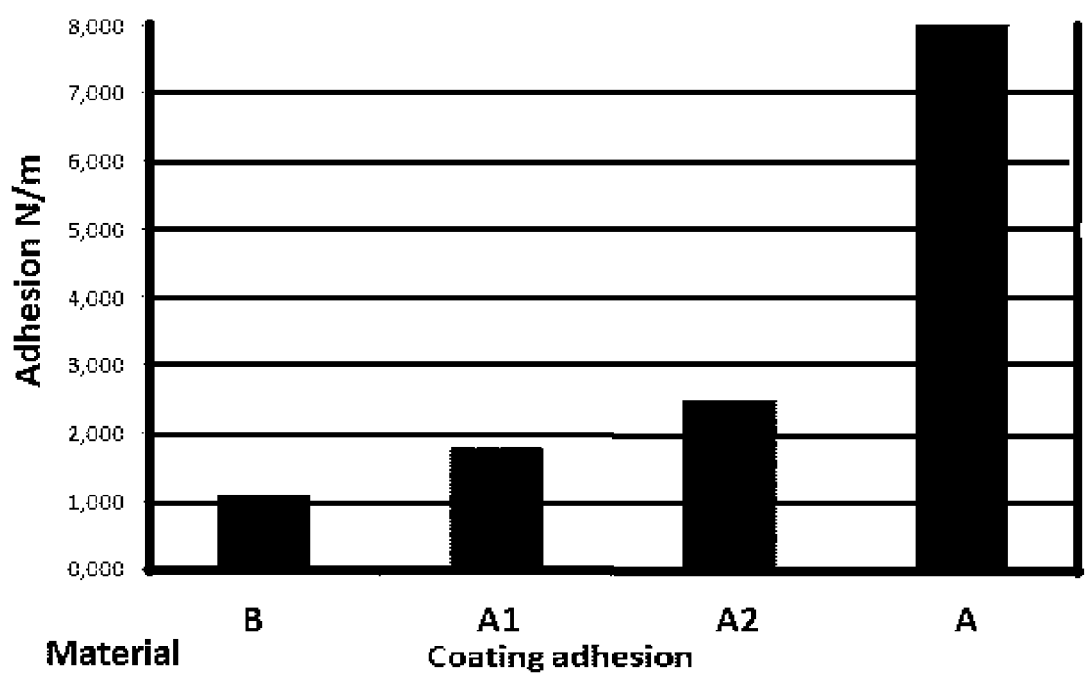

COATED BATTERY SEPARATOR

This application is a U.S. national stage entry under 35 U.S.C. § 371 of International Application No. PCT/EP2016/075013 filed Oct. 19, 2016, which claims priority to European application No. 15190363.0 filed on Oct. 19, 2015. The entire contents of these applications are explicitly incorporated herein by this reference.

TECHNICAL FIELD

The present invention pertains to an at least partially coated separator for an electrochemical cell, to a method for its preparation and to an electrochemical cell comprising such separator.

BACKGROUND ART

Vinylidene fluoride polymers are known in the art to be suitable as binders for the manufacture of composite separators for use in non-aqueous-type electrochemical devices such as batteries, preferably secondary batteries, and electric double layer capacitors.

Inorganic filler materials have been long used to fabricate battery separators having a composite structure, said composite separators comprising the filler materials distributed in a polymeric binder matrix. These filler materials are typically produced as finely divided solid particulates and used for reinforcing the polymeric binder material used to fabricate the separator.

A separator precursor solution is typically formulated as an ink or paste comprising a solid particulate material dispersed in a solution of a polymer binder in a suitable solvent. The ink solution so obtained is usually disposed onto a surface of a non-coated inert support or of an electrode layer and the solvent is then removed from the solution layer to deposit a separator layer which adheres to the electrode.

A solvent system is typically used to disperse the polymer binder, which generally comprises N-methyl pyrrolidone or mixtures of N-methyl pyrrolidone and a diluting solvent such as acetone, propyl acetate, methyl ethyl ketone and ethyl acetate.

For instance, US 2002/0168569 (ATOFINA) 14 Nov. 2002 discloses a process for manufacturing separators for Lithium-ion batteries, said process comprising processing a microcomposite powder comprising from 20% to 80% by weight of a fluoropolymer and from 80% to 20% by weight of fillers. This microcomposite powder may be processed in order to result in separators suitable for use in Lithium-ion batteries notably by dispersion in water or in a solvent such as acetone or N-methyl-2-pyrrolidone to obtain a paste which is then applied to a support by doctor blading and dried.

Also, WO 2013/120858 (SOLVAY SPECIALTY POLYMERS ITALY S.P.A.) 22 Aug. 2013 discloses a process for manufacturing composite separators for batteries, said process comprising applying onto a substrate layer a coating composition comprising an aqueous latex comprising a vinylidene fluoride polymer and a non-electroactive inorganic filler material.

However, because of affinity of separators based on vinylidene fluoride polymers with polar solvents in liquid organic electrolytes, the polymeric phase may undergo swelling, which weakens their mechanical properties. See, for instance, SAUNIER, J., et al. Plasticized microporous poly(vinylidene fluoride) separators for Lithium-ion batteries. Journal of Polymer Science—Part B—Polymer physics. 2004, vol. 42, p. 532-543.

There is thus still a need in the art for a cost-effective and environmentally-friendly process enabling easy manufacture of battery separators suitable for use in electrochemical devices.

SUMMARY OF INVENTION

It has been developed a battery separator comprising a substrate layer at least partially coated with a composition (composition (C)) comprising a plurality of primary particles comprising at least one vinylidene fluoride copolymer (copolymer (A)) comprising at least 10 wt % of recurring units derived from hexafluoropropylene, wherein the primary particles of copolymer (A) have an average primary particle size of less than 1 micrometer, as measured according to ISO 13321.

In an aspect, the present invention pertains to a electrochemical cell, such as a secondary battery or a capacitor, comprising the at least partially coated separator as defined above.

In an aspect, the invention pertains to a process for the preparation of a battery separator as defined above, said process comprising the steps of:
i) providing a non-coated substrate layer (P);
ii) providing a coating composition (C) comprising an aqueous dispersion comprising primary particles comprising at least one vinylidene fluoride copolymer (copolymer (A)) comprising at least 10 wt % of recurring units derived from hexafluoropropylene, wherein the primary particles of copolymer (A) have an average primary particle size of less than 1 micrometer, as measured according to ISO 13321;
iii) applying the coating composition (C) of step ii at least partially on at least one portion of the substrate layer (P); and
iv) drying the at least partially coated substrate layer (P) of step iii.

In another aspect, the present invention provides an aqueous composition comprising an emulsion in water of a mixture of:
a) primary particles comprising at least one vinylidene fluoride copolymer (copolymer (A)) comprising at least 10 wt % of recurring units derived from hexafluoropropylene, and
b) primary particles comprising at least one vinylidene fluoride polymer (polymer (B)) comprising less than 1 wt % of recurring units derived from hexafluoropropylene,
wherein the primary particles of copolymer (A) and of polymer (B) have an average primary particle size of less than 1 micrometer, as measured according to ISO 13321.

In another aspect, the present invention pertains to a process for the preparation of an aqueous composition as defined above, said process comprising the step of mixing an aqueous latex comprising the primary particles of copolymer (A) and an aqueous latex comprising the primary particles of polymer (B).

BRIEF DESCRIPTION OF DRAWINGS

FIG. 1 depicts the results of an adhesion test carried out on separators according to the invention (A, A1 and A2) and comparative separator B, which was prepared using a coating composition that did not contain VDF-HFP polymer (B).

DESCRIPTION OF EMBODIMENTS

In the context of the present invention, the term "weight %" (wt %) indicates the content of a specific component in a mixture, calculated as the ratio between the weight of the component and the total weight of the mixture. When referred to the recurring units derived from a certain monomer in a polymer/copolymer, weight % (wt %) indicates the ratio between the weight of the recurring units of such monomer over the total weight of the polymer/copolymer.

By the term "separator", it is hereby intended to denote a porous monolayer or multilayer polymeric material which electrically and physically separates electrodes of opposite polarities in an electrochemical cell and is permeable to ions flowing between them.

By the term "electrochemical cell", it is hereby intended to denote an electrochemical cell comprising a positive electrode, a negative electrode and a liquid electrolyte, wherein a monolayer or multilayer separator is adhered to at least one surface of one of said electrodes.

Non-limitative examples of electrochemical cells include, notably, batteries, preferably secondary batteries, and electric double layer capacitors.

For the purpose of the present invention, by "secondary battery" it is intended to denote a rechargeable battery. Non-limitative examples of secondary batteries include, notably, alkaline or alkaline-earth secondary batteries.

By the term "composite separator", it is hereby intended to denote a separator as defined above wherein non-electroactive inorganic filler materials are incorporated into a polymeric binder material. The composite separator obtained according to the invention is advantageously an electrically insulating composite separator suitable for use in an electrochemical cell.

The separator for an electrochemical cell of the present invention can advantageously be an electrically insulating composite separator suitable for use in an electrochemical cell. When used in an electrochemical cell, the composite separator is generally filled with an electrolyte which advantageously allows ionic conduction within the electrochemical cell. Preferably, said electrolyte is liquid or semi-liquid.

The separator for an electrochemical cell of the invention preferably comprise a non-electroactive inorganic filler material uniformly distributed within the composition (C) polymeric matrix. By the term "non-electroactive inorganic filler material", it is hereby intended to denote an electrically non-conducting inorganic filler material, which is suitable for the manufacture of an electrically insulating separator for electrochemical cells.

The non-electroactive inorganic filler material in the separator according to the invention typically has an electrical resistivity ($\rho$) of at least $0.1\times10^{10}$ ohm cm, preferably of at least $0.1\times10^{12}$ ohm cm, as measured at 20° C. according to ASTM D 257. Non-limitative examples of suitable non-electroactive inorganic filler materials include, notably, natural and synthetic silicas, zeolites, aluminas, titanias, metal carbonates, zirconias, silicon phosphates and silicates and the like. The non-electroactive inorganic filler material is typically under the form of particles having an average size of from 0.01 µm to 50 µm, as measured according to ISO 13321. Typically, the non-electroactive inorganic filler material is present in amount from 10 wt % to 90 wt % of composition (C), preferably from 50 wt % to 88 wt % or from 70 wt % to 85 wt %.

The non-electroactive inorganic filler material can be uniformly dispersed in the polymeric matrix of composition (C) to form pores having an average diameter of from 0.1 µm to 5 µm. The pore volume fraction of the composite separator obtained from the process of the invention is at least 25%, preferably at least 40%. The composite separator obtained from the process of the invention has a total thickness typically comprised between 2 µm and 100 µm, preferably between 2 µm and 40 µm.

For the purpose of the present invention, by vinylidene fluoride copolymer (copolymer (A)) comprising at least 10 wt % of recurring units derived from hexafluoropropylene (HFP), it is intended to denote a polymer derived from the polymerization of recurring units derived from vinylidene fluoride (VDF), present in the final copolymer in an amount that is at least 50% in weight over the total weight of the copolymer (herein: wt %), and of recurring units derived from hexafluoropropylene.

Preferably, the content of recurring units derived from HFP in the primary particles used as a coating in the separator according to the present invention is 20 to 45 wt %, more preferably from 25 to 43 wt %, even more preferably from 30 to 40 wt %.

In a preferred form, the coating of the separator according to the invention, in addition to the primary particles of copolymer (A) as defined above, further comprises a plurality of primary particles of one vinylidene fluoride polymer (hereafter: polymer (B)), different from copolymer (A) and comprising less than 1 wt % of recurring units derived from hexafluoropropylene, wherein the primary particles of polymer (B) have an average primary particle size of less than 1 micrometer, as measured according to ISO 13321. In other word, the separator according to the invention is preferably coated with a mixture of particles having particle size as defined above, wherein a portion of the particles comprises, or consists of, copolymer (A) and a portion of the particles comprises, or consists of, polymer (B).

In a preferred embodiment, the separator for an electrochemical cell according to the invention is at least partially coated with a mixture of primary particles as defined above, wherein the weight ratio of particles of copolymer (A) to particles of polymer (B) is from 10:90 to 90:10, preferably from 20:80 to 80:20, more preferably from 30:70 to 70:30 or 40:60 to 60:40. In a preferred embodiment, the separator for an electrochemical cell according to the invention is at least partially coated with a mixture of primary particles as defined above, wherein the weight ratio of particles of copolymer (A) to particles of polymer (B) is 50:50.

For the purpose of the present invention, by "average primary particle size" it is intended to denote primary particles of copolymer (A) and/or polymer (B) derived from aqueous emulsion polymerization. Primary particles of copolymer (A) and/or of polymer (B) are thus to be intended distinguishable from agglomerates (i.e. collection of primary particles), which might be obtained by recovery and conditioning steps of such polymer/copolymer manufacture such as concentration and/or coagulation of aqueous latexes of the polymer (B) or copolymer (A) and subsequent drying and homogenization to yield the respective powders.

The aqueous latex of the composition (C) used for coating the separator of the invention is thus distinguishable from an aqueous slurry prepared by dispersing powders a polymer or of a copolymer in an aqueous medium. The average particle size of powders of a polymer or copolymer dispersed in an aqueous slurry is typically higher than 1 µm, as measured according to ISO 13321.

Preferably, the average particle size of the primary particles of copolymer (A) and(or of polymer (B) as defined above is above 20 nm, more preferably above 30 nm, even more preferably above 50 nm, and/or is below to 600 nm, more preferably below 400 or below 300 nm, as measured according to ISO 13321.

Copolymer (A) and polymer (B) used in the form of primary particles as a coating in the separator according to the present invention may contain other co-monomers, i.e. units derived from monomers other than HFP and VDF, preferably in amounts below 5 wt %, typically below 2 wt % or 1 wt % over the total weight of the polymer (B) or copolymer (A).

Such co-monomers can be selected among those conventionally used as monomers copolymerizable with vinylidene fluoride, such as vinyl fluoride, trifluoroethylene, trifluorochloroethylene, tetrafluoroethylene, hexafluoropropylene, and fluoroalkyl vinyl ether, and mixtures thereof.

The copolymer (A) and/or of polymer (B) may typically comprise recurring recurring units derived from at least one (meth)acrylic monomer (MA) (i.e. a monomer structurally derived from acrylic acid or from methacrylic acid) of formula (I):

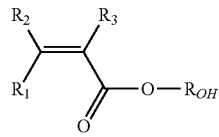
(I)

wherein:

$R_1$, $R_2$ and $R_3$, equal to or different from each other, are independently selected from a hydrogen atom and a $C_1$-$C_3$ hydrocarbon group, and $R_{OH}$ is a hydrogen atom or a $C_1$-$C_5$ hydrocarbon moiety comprising at least one hydroxyl group.

Should the copolymer (A) and/or of polymer (B) comprise recurring units derived from at least one (meth)acrylic monomer (MA), the polymer (B) typically comprises at least 0.01 wt %, preferably at least 0.02 wt %, more preferably at least 0.03 wt % of recurring units derived from at least one (meth)acrylic monomer (MA) having formula (I) as described above.

Should the copolymer (A) and/or of polymer (B) comprise recurring units derived from at least one (meth)acrylic monomer (MA), they typically comprise at least 0.01 wt %, preferably at least 0.02 wt %, more preferably at least 0.03 wt % of recurring units derived from at least one (meth)acrylic monomer (MA) having formula (I) as described above.

Should the copolymer (A) and/or of polymer (B) comprise recurring units derived from at least one (meth)acrylic monomer (MA), they typically comprise at most 10 wt %, preferably at most 5 wt %, more preferably at most 2 wt % of recurring units derived from at least one (meth)acrylic monomer (MA) of formula (I) as described above.

The (meth)acrylic monomer (MA) is preferably of formula (II):

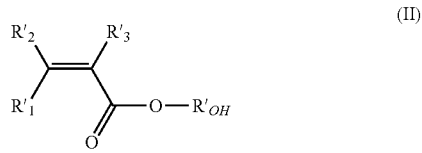
(II)

wherein:

$R'_1$, $R'_2$ and $R'_3$ are hydrogen atoms, and $R'_{OH}$ is a hydrogen atom or a $C_1$-$C_5$ hydrocarbon moiety comprising at least one hydroxyl group.

Non-limiting examples of (meth)acrylic monomers (MA) include, notably, acrylic acid, methacrylic acid, hydroxyethylmethacrylate, hydroxyethylacrylate, hydroxypropylmethacrylate, hydroxypropylacrylate, hydroxyethylhexylmethacrylate and hydroxyethylhexylacrylate The (meth)acrylic monomer (MA) is more preferably selected from the followings:

hydroxyethyl acrylate (HEA) of formula:

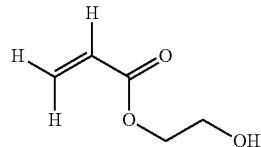

2-hydroxypropyl acrylate (HPA) of either of formulae:

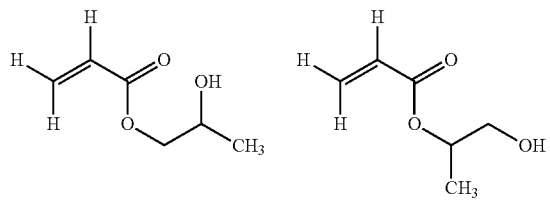

acrylic acid (AA) of formula:

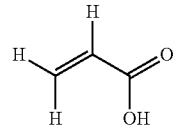

and mixtures thereof.

The (meth)acrylic monomer (MA) is even more preferably acrylic acid (AA) or hydroxyethyl acrylate (HEA).

The composition (C) can optionally comprise at least one other component, in addition to the primary particles of copolymer (A), and optionally of polymer (B). Preferably, said at least one optional component are selected from an antifoam agent, a surfactant, an anti-bacterial agent, a filler and mixtures thereof. Typically, such optional components, when present, are in an amount lower than 15 wt % over the weight of the latex solid content, preferably below 10 wt % or below 7 wt %.

Typically, the total solid content of the latex is from 20 wt % to 60 wt % over the total weight of the latex, for example 55 wt %, 50 wt % or 45 wt %.

In the context of the invention, the term "substrate layer" is hereby intended to denote either a monolayer substrate consisting of a single layer or a multilayer substrate comprising at least two layers adjacent to each other.

The substrate layer (P) may be either a non-porous substrate layer or a porous substrate layer. Should the substrate layer be a multilayer substrate, the outer layer of said substrate may be either a non-porous substrate layer or a porous substrate layer. By the term "porous substrate layer", it is hereby intended to denote a substrate layer containing pores of finite dimensions.

The substrate (P) has typically a porosity advantageously of at least 5%, preferably of at least 10%, more preferably of at least 20% or at least 40% and advantageously of at most 90%, preferably of at most 80%.

The thickness of substrate (P) is not particularly limited and is typically from 3 to 100 micrometer, preferably form 5 and 50 micrometer.

The substrate (P) is advantageously a fabric made from one or more sets of polymer fibres. For the purpose of the present invention, the term "fabric" is understood to mean a planar textile structure obtainable by interlacing one or more sets of polymer fibres leading to numerous pores.

The fabric may be a woven fabric made from one or more sets of polymer fibres or a non-woven fabric made from one or more sets of polymer fibres.

By "woven fabric" it is intended to denote a planar textile structure obtainable by interlacing two or more sets of polymer fibres at right angles to each other thereby providing ends which run lengthwise in the fabric and picks which run crosswise in the fabric. By "non-woven fabric" it is intended to denote a planar textile structure obtainable by randomly interlocking or bonding mechanically, thermally or chemically one or more sets of polymer fibres leading to numerous pores.

The fabric may be a uni-directional fabric wherein the majority of the polymer fibres run in one direction, or a multi-directional fabric wherein two or more sets of continuous fibres run in different directions.

The substrate (P) can be made by any porous substrate or fabric commonly used for a separator in electrochemical device, comprising at least one material selected from the group consisting of polyethyleneterephthalate, polybutyleneterephthalate, polyester, polyacetal, polyamide, polycarbonate, polyimide, polyetheretherketone, polyethersulfone, polyphenyleneoxide, polyphenylenesulfide, polyethylenenaphthalene, polyvinylidene fluoride, polyethyleneoxide, polyacrylonitrile, polyethylene and polypropylene, or their mixtures. Preferably, the substrate (P) is polyethylene or polypropylene.

The ratio between the weight of the coating and the weight of the support layer in the at least partially coated separator according to the invention is typically 3:1 to 0.5:1, such as 2:1, 1.5:1, 1:1 or 0.75:1.

The inventors found that in the separator according to the invention the adhesion of the composition (C) as defined above to substrate layer (P) in the separator according to the invention is remarkably higher than that obtainable using a coating composition comprising exclusively primary particles comprising a vinylidene fluoride polymer containing less than 10 wt % in weight of recurring units derived from hexafluoropropylene.

In the separator according to the invention, a suitable adhesion is obtained also in the absence of carboxymethyl cellulose (CMC) as a binder. Due to issues linked to the low thermal, chemical and electrochemical stability of CMC, the possibility to avoid its presence in the separator coating is a remarkable advantage.

In an aspect, the present invention provides a process for the preparation of a battery separator as described above, wherein the process comprises the steps of:

i) providing a non-coated substrate layer (P);

ii) providing a coating composition (C) comprising an aqueous dispersion comprising primary particles comprising at least one vinylidene fluoride copolymer (copolymer (A)) comprising at least 10 wt % of recurring units derived from hexafluoropropylene, wherein the primary particles of copolymer (A) have an average primary particle size of less than 1 micrometer, as measured according to ISO 13321;

iii) applying the coating composition (C) of step ii at least partially on at least one portion of the substrate layer (P); and iv) drying the at least partially coated substrate layer (P) of step iii.

Preferably, in the process according to the invention the at least partially coated substrate layer (P) is dried at a temperature carried out at a temperature lower than 55° C., preferably lower than 40° C., more preferably lower than 30° C.

The coating composition (C) is typically applied onto at least one surface of a substrate layer by a technique selected from casting, spray coating, roll coating, doctor blading, slot die coating, gravure coating, ink jet printing, spin coating and screen printing, brush, squeegee, foam applicator, curtain coating, vacuum coating.

The inventor have found that by using the specific composition (C) as defined above a coated battery separator can be obtained via a process wherein the final drying step is carried out at a temperature lower than 50° C., advantageously at a temperature as low as 25-30° C. By virtue of this feature, the process according to the invention requires less heating power with respect to processes wherein the final drying temperature is as high as 180° C. (e.g. WO 2013/120858 A (SOLVAY SPECIALTY POLYMERS ITALY S.P.A.) 22 Aug. 2013, and documents cited there that are incorporated by reference in the present document), ultimately resulting in a more cost-effective and environmentally-friendly process.

In another aspect, the present invention pertains to an aqueous composition comprising an emulsion in water (i.e. a latex) of a mixture of:

a) primary particles comprising at least one vinylidene fluoride copolymer (copolymer (A)) comprising at least 10 wt % of recurring units derived from hexafluoropropylene, and b) primary particles comprising at least one vinylidene fluoride polymer (polymer (B)) comprising less than 1 wt % of recurring units derived from hexafluoropropylene, wherein the primary particles of copolymer (A) and of polymer (B) have an average primary particle size of less than 1 micrometer, as measured according to ISO 13321.

Preferably, in said aqueous composition the mixture of primary particles of copolymer (A) and of polymer (B) is in a weight ratio from 10:90 to 90:10, preferably from 20:80 to 80:20, from 30:70 to 70:30 or 40:60 to 60:40, or wherein the weight ratio of particles of copolymer (A) to particles of polymer (B) is 50:50.

Said composition is particularly suitable for the coating of surfaces, particularly of porous surfaces such as that of separators for electrochemical cells. The aqueous composition according to the invention is particularly advantageous for the preparation of coated or semi-coated separators suitable for use in Lithium-based secondary batteries, such as lithium-ion and lithium metal secondary batteries.

Advantageously, said aqueous composition is prepared according to the present invention via a process comprising the step of mixing an aqueous latex comprising the primary particles of copolymer (A) and an aqueous latex comprising the primary particles of polymer (B).

Should the disclosure of any patents, patent applications, and publications which are incorporated herein by reference conflict with the description of the present application to the extent that it may render a term unclear, the present description shall take precedence.

The invention is described hereunder in more detail with reference to the following example, which are provided with the purpose of merely illustrating the invention, with no intention to limit its scope.

EXPERIMENTAL PART

Example

The polyolefin substrate (Tonen® F20BMU, PE material, 20 μm, 40% porosity, pore size of 0.09 μm) was coated by using a solution of VDF-based latexes mixed with alumina (CR6® by Baikowski), SDS (sodium dodecyl sulfate 28% by Ametech®, a surfactant to improve the polyolefin substrate wettability) and BYK® 023 (an antifoaming agent by BYK-Chemie).

The following latexes were used:
- latex A: copolymer of VDF and 39 wt % HFP (copolymer (A)), comparative example,
- latex B: polymer of VDF, 0 wt % HFP (polymer (B)), comparative example,
- latex A1: mixture of latex A and latex B in 90/10 volume ratio,
- latex A2: mixture of latex A and latex B in 80/20 volume ratio.

All components were added in the following percentages: alumina 87 wt %; VDF-based latex 10 wt %; surfactant 2 wt %; antifoaming 1 wt %, all percentages were calculated on the weight of the component with respect to the total solid content. Then, water was added to obtain an ideal solid content in the range 48 wt %-53 wt % depending on the type of latex used. Two kinds of VDF based latexes were used differentiating for the amount of HFP content; their mixtures were also tested to evaluate the effect of HFP percentage on coating adhesion (all data are reported in table). All ingredients were mixed together for at least 20 minutes by using a speedy mixer at 2000 rpm for HFP-poor emulsions (latex B) and at 1000 rpm for HFP-rich emulsions (latex A, A1 and A2).

The solution was then cast on the substrate by using a casting knife to create a coating with average thickness of 10 micrometer. Finally, the coating was dried at 25-27° C.

Peeling tests were performed by following the standard ASTM D903 to verify the adhesion of the coating on the polyolefin substrate. The results are shown in Table 1 and illustrated in FIG. 1.

TABLE 1

| Latex | Coating adhesion [N/m] |
|---|---|
| B | 1.1 ± 0.3 |
| A1 | 1.8 ± 0.5 |
| A2 | 2.5 ± 0.1 |
| A | 8.0 ± 0.9 |

A substantial increase in adhesion of the coating to the substrate layer, with respect to the comparative latex B, was observed for coating compositions comprising latex A (containing copolymer (A) according to the invention), alone or in mixture with latex B, in volume ratio as low as 10:90.

Swelling tests were performed on circular moulded polymeric samples having a thickness of 1.5 mm and a diameter of 25 mm of latex A2 as compared to latex A and latex B. The samples were dried at 55° C. under vacuum overnight. The weight of the dried samples was measured. Then, each sample was soaked in ethylene carbonate (EC) and dimethyl carbonate (DMC) (EC:DMC 1:1). The excess of solvent on the surface of each sample was removed using an absorbent tissue before weighing the samples and the weight of the wet samples was measured after 3 hours, 6 hours and 24 hours. The results are shown in Table 2.

TABLE 2

| | Weight increase [%] | | |
|---|---|---|---|
| Latex | 3 h | 6 h | 24 h |
| B | 1.73 ± 0.20 | 2.27 ± 0.08 | 4.57 ± 0.15 |
| A2 | 2.94 ± 1.03 | 4.71 ± 1.04 | 14.71 ± 1.42 |
| A | 71.3 ± 7.01 | 101.88 ± 6.05 | 132.18 ± 10.60 |

A substantial decrease in swelling of the coating composition comprising latex A in mixture with latex B (e.g. latex A2), with respect to comparative latex A and latex B, was observed.

The invention claimed is:

1. A separator for an electrochemical cell, the separator comprising a substrate layer (P) at least partially coated with a composition (C), said composition (C) comprising:
   a plurality of primary particles comprising at least one vinylidene fluoride copolymer (A) comprising at least 10 wt % of recurring units derived from hexafluoropropylene, and
   a plurality of primary particles comprising at least one vinylidene fluoride polymer (B) comprising less than 1 wt % of recurring units derived from hexafluoropropylene, wherein the primary particles of copolymer (A) and of polymer (B) have an average primary particle size of less than 1 micrometer, as measured according to ISO 13321.

2. The separator for an electrochemical cell according to claim 1, wherein the copolymer (A) in the composition (C) further comprises at most 10 wt % of recurring units derived from at least one (meth)acrylic monomer (MA) of formula (I):

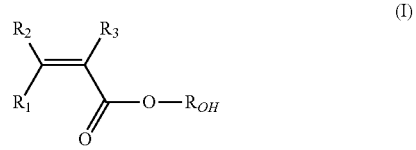

wherein:

R$_1$, R$_2$ and R$_3$, equal to or different from each other, are independently selected from a hydrogen atom and a C$_1$-C$_3$ hydrocarbon group, and R$_{OH}$ is a hydrogen atom or a C$_1$-C$_5$ hydrocarbon moiety comprising at least one hydroxyl group.

3. The separator for an electrochemical cell according to claim 1, wherein composition (C) comprises a mixture of primary particles of copolymer (A) and of polymer (B) in a weight ratio from 10:90 to 90:10.

4. The separator for an electrochemical cell according to claim 3, wherein composition (C) comprises a mixture of primary particles of copolymer (A) and of polymer (B) in a weight ratio from 20:80 to 80:20.

5. The separator for an electrochemical cell according to claim 3, wherein composition (C) comprises a mixture of primary particles of copolymer (A) and of polymer (B) in a weight ratio from 30:70 to 70:30.

6. The separator for an electrochemical cell according to claim 3, wherein composition (C) comprises a mixture of primary particles of copolymer (A) and of polymer (B) in a weight ratio from 40:60 to 60:40.

7. The separator for an electrochemical cell according to claim 1, wherein the substrate layer is selected from the group consisting of polyethylene terephthalate, polyethyleneterephthalate, polybutyleneterephthalate, polyester, polyacetal, polyamide, polycarbonate, polyimide, polyetheretherketone, polyethersulfone, polyphenyleneoxide, polyphenylenesulfide, polyethylenenaphthalene, polyvinylidene fluoride, polyethyleneoxide, polyacrylonitrile, polyethylene and polypropylene, or their mixtures.

8. The separator for an electrochemical cell according to claim 1, wherein composition (C) further comprises non-electroactive inorganic filler material.

9. A process for the preparation of a separator for an electrochemical cell according to claim 1, said process comprising:
  applying a coating composition (C) on at least one portion of a non-coated substrate layer (P); and
  drying the at least partially coated substrate layer (P),
    wherein coating composition (C) comprises an aqueous dispersion comprising:
      primary particles comprising at least one vinylidene fluoride copolymer (A) comprising at least 10 wt % of recurring units derived from hexafluoropropylene, and
      primary particles comprising at least one vinylidene fluoride polymer (B) comprising less than 1 wt % of recurring units derived from hexafluoropropylene, wherein the primary particles of copolymer (A) have an average primary particle size of less than 1 micrometer, as measured according to ISO 13321.

10. The process according to claim 9, wherein the at least partially coated substrate layer (P) is dried at a temperature lower than 55° C.

11. The process according to claim 10, wherein the at least partially coated substrate layer (P) is dried at a temperature lower than 40° C.

12. The process according to claim 10, wherein the at least partially coated substrate layer (P) is dried at a temperature lower than 30° C.

13. An electrochemical cell comprising a separator according to claim 1.

14. An aqueous composition comprising an emulsion in water of a mixture of:
  a) primary particles comprising at least one vinylidene fluoride copolymer (A) comprising at least 10 wt % of recurring units derived from hexafluoropropylene, and
  b) primary particles comprising at least one vinylidene fluoride polymer (B) comprising less than 1 wt % of recurring units derived from hexafluoropropylene, wherein the primary particles of copolymer (A) and of polymer (B) have an average primary particle size of less than 1 micrometer, as measured according to ISO 13321.

15. The aqueous composition according to claim 14, wherein the mixture of primary particles of copolymer (A) and of polymer (B) is in a weight ratio from 10:90 to 90:10.

16. The aqueous composition according to claim 15, wherein the mixture of primary particles of copolymer (A) and of polymer (B) is in a weight ratio from 20:80 to 80:20.

17. The aqueous composition according to claim 15, wherein the mixture of primary particles of copolymer (A) and of polymer (B) is in a weight ratio from 30:70 to 70:30.

18. The aqueous composition according to claim 15, wherein the mixture of primary particles of copolymer (A) and of polymer (B) is in a weight ratio from 40:60 to 60:40.

19. A process for the preparation of an aqueous composition according to claim 14, said process comprising the step of mixing an aqueous latex comprising the primary particles of copolymer (A) and an aqueous latex comprising the primary particles of polymer (B).

* * * * *